United States Patent [19]
Kawamukai et al.

[11] Patent Number: 5,340,343
[45] Date of Patent: Aug. 23, 1994

[54] MARINE PROPULSION UNIT

[75] Inventors: Kenji Kawamukai; Yasunori Furuta, both of Hamamatsu, Japan

[73] Assignee: Sanshin Kogyo Kabushiki Kaisha, Hamamatsu, Japan

[21] Appl. No.: 47,096

[22] Filed: Apr. 13, 1993

[30]  Foreign Application Priority Data

Apr. 14, 1992 [JP] Japan ............................ 4-120046

[51] Int. Cl.⁵ ............................................. B63H 21/10
[52] U.S. Cl. ............................................. 440/88; 440/77
[58] Field of Search ............ 440/77, 76, 88, 900; 123/195 C, 195 P; 181/69.2, 69, 22, 204, 229, 264, 267

[56]  References Cited

FOREIGN PATENT DOCUMENTS

| | | |
|---|---|---|
| 58-199295 | 11/1983 | Japan . |
| 0063995 | 3/1990 | Japan .................................... 440/77 |
| 4092796 | 3/1992 | Japan .................................... 440/77 |

Primary Examiner—Edwin L. Swinehart
Attorney, Agent, or Firm—Knobbe, Martens, Olson & Bear

[57]  ABSTRACT

Two embodiments of protective cowling arrangements for outboard motors that provide a forwardly facing air inlet having a lower inlet atmospheric inlet opening which communicates with a higher atmospheric air passage that extends through the protective cowling to its interior. A plurality of horizontal baffles assist in water separation for the inducted air and additional air may be inducted through a rear air inlet opening in the protective cowling.

22 Claims, 3 Drawing Sheets

MARINE PROPULSION UNIT

BACKGROUND OF THE INVENTION

This invention relates to a marine propulsion unit and more particularly to an improved cowling arrangement for the power head of an outboard motor.

As is well known, most outboard motors include a power head that is comprised of a powering internal combustion engine and a surrounding protective cowling. The protective cowling serves primarily the function of protecting the internal combustion engine from the surrounding atmosphere and particularly the water which is present due to the operation of the engine in a body of water. However, it is also necessary for the protective cowling to be formed with an arrangement for permitting air to be drawn into the protective cowling for a variety of purposes, the primary of which is providing combustion air for the engine operation. A wide variety of arrangements have been proposed for permitting such air induction into the protective cowling.

Of course, the requirements for air for the engine operation give rise to a number of problems which result in compromises. Although copious amounts of air are required to ensure good engine performance, unrestricted air flow into the protective cowling can sweep water into the protective cowling and thus obviate the main purpose of the protective cowling in protecting the engine from water. In addition, most protective cowlings dispose the air inlet in the rear portion and when the watercraft is abruptly slowed, water may splash back up onto the protective cowling and enter the air inlet and cause corrosion damage to the enclosed engine.

It has been proposed to provide additional air flow to the protective cowling through the provision of an additional front air entrance to the protective cowling. These front air entrances are less likely to have water swept into them on -extreme decelerations. However, front air inlets are also more likely to ingest water during the forward travel of the watercraft than rearward air inlets.

It is, therefore, a principal object of this invention to provide an improved air inlet arrangement for the outer cowling of an outboard motor that will afford adequate air flow to the engine and which will effectively preclude the induction of water into the protective cowling.

It is a yet further object of this invention to provide an improved front air inlet arrangement for the protective cowling of an outboard motor.

SUMMARY OF THE INVENTION

This invention is adapted to be embodied in a protective cowling for the power head of an outboard motor that is adapted to be affixed to the transom of an associated watercraft and having a forwardly facing portion and a rearwardly facing portion. The power head comprises an internal combustion engine and a surrounding protective cowling. The protective cowling is comprised of a member forming an upwardly facing opening communicating the atmosphere with the interior of the protective cowling. Means define an atmospheric air inlet at a lower portion of the outer cover and means define a labyrinthine air path from the atmospheric air inlet to the upwardly facing opening for assisting in the separation of water from the air entering the protective cowling.

DETAILED DESCRIPTION OF THE PREFERRED EMBODIMENTS OF THE INVENTION

Figure 1:
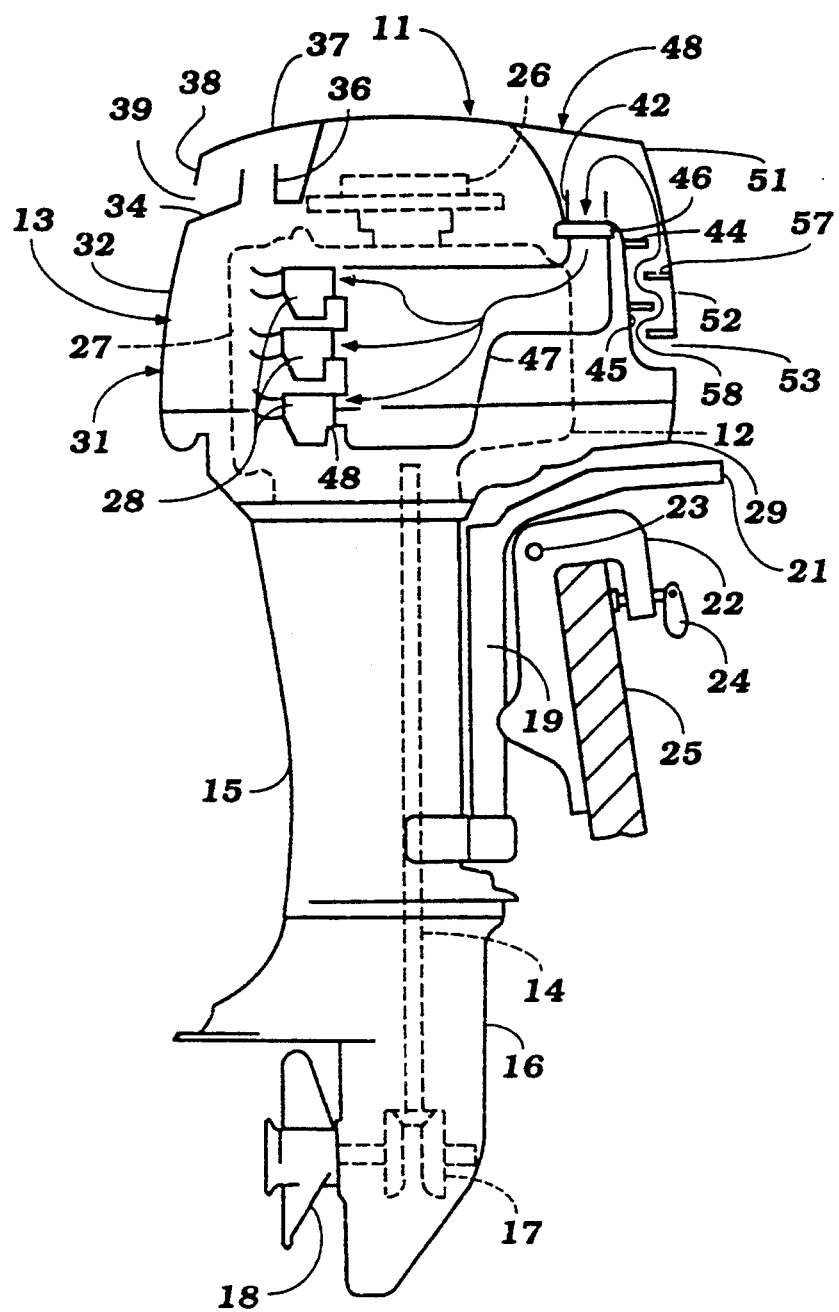
FIG. 1 is a side elevational view, with portions broken away and other portions shown schematically of an outboard motor constructed in accordance with a first embodiment of the invention.
Figure 2:
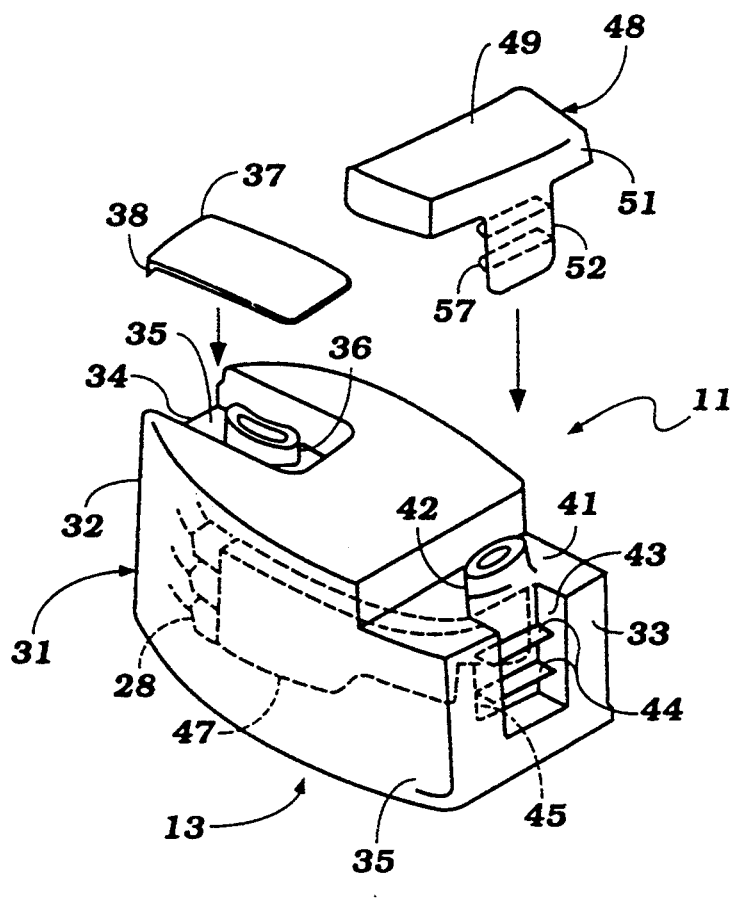
FIG. 2 is an exploded perspective view of the outer cowling looking from the front and side thereof.

An outboard motor constructed in accordance with a first embodiment of the invention is depicted in FIGS. 1 and 2 and is identified generally by the reference numeral 11. The outboard motor 11 includes a power head comprised of a powering internal combustion engine 12 and a surrounding protective cowling, indicated generally by the reference numeral 13. In the illustrated embodiment, the engine 12 is of the V-6 type and operates on a two-stroke crankcase compression principle. As will become apparent to those skilled in the art, the invention or certain facets of it may be employed in conjunction with engines having other cylinder numbers and other cylinder configurations as well as engines operating on the four-stroke as well as the two-stroke principle.

As is conventional with outboard motor practice, the engine 12 is disposed so that its output shaft rotates about a vertically disposed axis and this output shaft is coupled, in a known manner, to a drive shaft 14. The drive shaft 14 depends into and is rotatably journaled within a drive shaft housing 15 having a lower unit 16 at its lower end. A conventional forward/neutral/reverse transmission 17 is contained within the lower unit 16 and is driven by the drive shaft 14 for selectively driving a propeller 18 in forward or reverse directions.

A steering shaft (not shown) is affixed to the drive shaft housing 15 and is journaled for rotation within a swivel bracket 19 for steering of the outboard motor 11 in a well known manner. A tiller 21 is affixed to the upper end of the steering shaft for this steering operation. The swivel bracket 19 is, in turn, pivotally connected to a clamping bracket 22 by means of pivot 23 which extends generally horizontally for tilt and trim movement of the outboard motor 11. The clamping bracket 22 includes a clamping device 24 so as to facilitate detachable connection of the outboard motor 11 to a transom 25 of an associated watercraft.

The construction of the outboard motor 11 as thus far described may be considered to be conventional and since the invention deals primarily with the protective cowling 13 and its interrelationship with the engine 12, further details of the description of the components of the outboard motor which may be considered to be conventional are not believed to be necessary. Those skilled in the art will readily understand how the invention can be practiced in conjunction with various types of outboard motors.

As has been noted, the particular detailed construction of the engine 12 is also not critical to the invention but FIGS. 1 and 2 show an embodiment of the invention wherein the engine output shaft, which as previously noted is vertically extending, has a flywheel magneto 26 affixed to its upper end and has its crankcase chamber 27 formed at the rear end of the power head. Being of the six cylinder crankcase compression type, the engine 12 is provided with three carburetors on each side thereof, indicated generally by the reference numeral 28, each of which supplies a fuel/air charge to the respective crankcase chamber of the engine 12. This crankcase chamber is positioned to the rear of the engine because of the orientation already described.

Referring now primarily to FIGS. 1 and 2, the protective cowling 13 is comprised of a lower tray portion 29 which is formed from a light-weight metal alloy such as aluminum or an aluminum alloy and which is affixed to the upper end of the drive shaft housing 15 in a suitable manner. The cowling 13 further includes an upper main cowling assembly, indicated generally by the reference numeral 31, which is of a multi-part type and which is detachably connected to the tray 29 in any conventional manner.

The upper cowling part 31 is preferably formed from a light-weight material such as a molded fiberglass reinforced resin. The upper cowling part 31 is comprised of a main body portion 32 which has a front side 33 and a rear side 34. Curved side surfaces 35 extend between the front and rear sides 33 and 34 so as to form a neat and streamlined appearance.

There is provided a recessed area 35 at the upper portion of the rear wall 32 which has an upwardly extending generally oval shaped section 36 which provides a main or first air inlet which communicates at its upper end with the atmosphere, in a manner to be described, and at its lower end with the interior of the protective cowling 13 so as to supply atmospheric air thereto. A separate cover piece 37 has a snap or other form of connection to extend across the upper end of the air inlet 36 and form an upper closure for the rear cavity formed by the recessed area 35.

A rear flange 38 of the cover piece 37 terminates short of the upper edge of the rear wall 32 which defines the cavity so as to provide a slotted air inlet 39 through which atmospheric air may enter. This atmospheric air must turn to reach the upper end of the air inlet passage 36 and then flow downwardly. This air flow tends to separate water particles from the inducted air and will also ensure that any water which may splash up onto the back of the outboard motor 11 under extreme decelerations will not enter the interior of the protective cowling 13.

The construction of the protective cowling 13 as thus far described may be considered to be conventional and the air inlet portion 36, if it is to effectively preclude water entry, may not offer adequate air flow for all of the combustion requirements of the engine. Therefore, there is provided a further forward air inlet which will now be described.

This forward air inlet includes a further recess, indicated generally by the reference numeral 41 which is formed in the front wall 33 and which has an upwardly extending air inlet opening 42 which communicates with the interior of the protective cowling 13, as with the inlet portion 36. A further cavity 43 is formed in the front wall 33 at the base of the recess 41 and extends toward the lower portion of the cowling portion 31. A plurality of horizontally extending baffles 44 are formed integrally in the cavity 43 and extend from a rear surface 45 thereof.

The inlet portion 42 terminates at its lower end in a flange 46 which is in sealing engagement with a pair of air distributors 47 (only one of which appears in the figures) which extend along and are formed integrally with the inner side of the main cowling piece 31 and which have outlet openings 48 which register with the air horns of the carburetors 28 at each side of the cowling 13 so as to supply air to the carburetors 28 for combustion purposes.

The cavities 41 and 43 are generally closed by means of a closure piece 48 which has a somewhat T-shaped configuration that is comprised of a top surface 49 and a front surface 51 which are received over and close the recess 41 of the cowling piece 32. A tab-like projection 52 extends from the front piece 51 and terminates at a point above the lower end of the recess 43 so as to define an air inlet opening 53 at the front of the outboard motor which is well below the upper end of the inlet opening 42. A plurality of integral tabs 54 extend from the cover piece extension 52 and form a labyrinthine type of air flow pattern as shown in FIG. 1 through which the front air intake must pass so as to assist in the separation of water from the air which is drawn through the front of the protective cowling. The air flow path is identified by the reference numeral 58 in FIG. 1.

Hence, it should be readily apparent that the described construction will permit adequate air flow to the engine for combustion and other purposes but will also ensure against the induction of any large amounts of water into the interior of the protective cowling 13 to avoid corrosion to the engine 12 and its various components.

Figure 3:
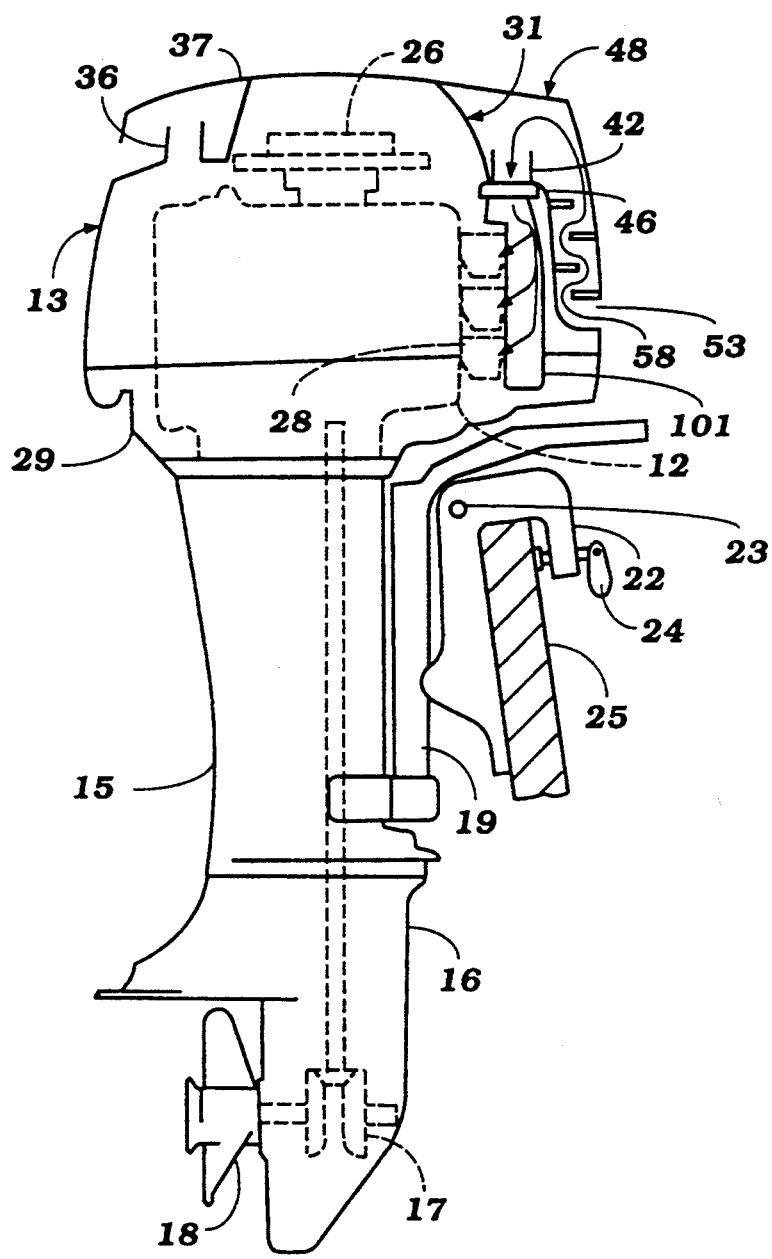
FIG. 3 is a side elevational view, in part similar to FIG. 1 and shows a second embodiment of the invention.

FIG. 3 illustrates another embodiment of the invention which is generally the same as the embodiment of FIGS. 1 and 2. In this embodiment, however, the engine is disposed in a reversed orientation from that of the previously described embodiment so that the carburetors 28 are formed at the front of the engine and face forwardly. Because of this, the large inlet ducts 47 on the opposite sides of the protective cowling can be eliminated and the inlet passage 42 can communicate directly with the inlet portions of the carburetors 28 through a relatively small manifold 101 which may be formed integrally with or as a separate piece for the main cowling portion 31.

It should be readily apparent from the foregoing description that the described embodiments of this invention are extremely effective in providing adequate air flow to an outboard motor while, at the same time, ensuring against the likelihood that water can be drawn into the interior of the protective cowling and cause damage to it. Of course, the foregoing is a description of preferred embodiments of the invention and various changes and modifications may be made without departing from the spirit and scope of the invention, as defined by the appended claims.

We claim:

1. A protective cowling for the power head of an outboard motor adapted to be affixed to the transom of an associated watercraft and having a forwardly facing portion and rearwardly facing portion, said power head comprising an internal combustion engine and a surrounding protective cowling, said protective cowling being comprised of a member forming an upwardly facing opening at one side thereof communicating the atmosphere with the interior of said protective cowling, means defining an atmosphere air inlet at a lower portion of said outer cowling on the side and adjacent said upwardly facing opening, and means defining an upwardly extending labyrinthine air flow path between said atmospheric air inlet and an area at the top of said protective cowling communicating with said upwardly facing opening.

2. A protective cowling for the power band of an outboard motor adapted to be affixed to the transom of an associated watercraft and having a forwardly facing portion and rearwardly facing portion, said power head comprising an internal combustion engine and a surrounding protective cowling, said protective cowling being comprised of a member forming an upwardly facing opening communicating the atmosphere with the interior of said protective cowling, means defining an atmospheric air inlet at a lower portion of said outer cowling, and means defining a labyrinthine air flow path between said atmospheric air inlet and said upwardly facing opening comprising a recess in a member forming the upwardly facing opening and plurality of baffles formed integrally therewith and cooperating baffles formed on a cover piece affixed to said member and defining with said member recess the atmospheric air inlet.

3. A protective cowling for the power head of an outboard motor as set forth in claim 2 wherein the recess is formed in a forward portion of the member.

4. A protective cowling for the power head of an outboard motor as set forth in claim 3 wherein the baffles extend generally horizontally.

5. A protective cowling for the power head of an outboard motor as set forth in claim 4 wherein the air inlet serves a plurality of induction devices of the engine through a manifold formed internally of the member.

6. A protective cowling for the power head of an outboard motor as set forth in claim 1 wherein the air inlet is formed at the front portion of the member.

7. A protective cowling for the power head of an outboard motor as set forth in claim 6 further including a rear air inlet opening formed in the protective cowling.

8. A protective cowling for the power head of an outboard motor adapted to be affixed to the transom of an associated watercraft and having a forwardly facing portion and rearwardly facing portion, said power head comprising an internal combustion engine and a surrounding protective cowling, said protective cowling being comprised of a member forming first and second upwardly facing openings communicating the atmosphere with the interior of said protective cowling at the front and rear of said member, means defining an atmospheric air inlet at a lower portion of said outer cowling, and means defining a vertically extending labyrinthine air flow path between said atmospheric air inlet and an area at the top of said protective cowling communicating with said first upwardly facing opening, said labyrinthine air flow path being formed by a recess in said member forming the upwardly facing openings and a plurality of baffles formed integrally therewith and cooperating baffles formed on a cover piece affixed to said member and defining with said member recess the atmospheric air inlet.

9. A protective cowling for the power head of an outboard motor as set forth in claim 8 wherein the recess is formed in a forward portion of the member.

10. A protective cowling for the power head of an outboard motor as set forth in claim 9 wherein the baffles extend generally horizontally.

11. A protective cowling for the power head of an outboard motor as set forth in claim 10 wherein the air inlet serves a plurality of induction devices of the engine through a manifold formed internally of the first mentioned member.

12. A protective cowling for the power head of an outboard motor adapted to be affixed to the transom of an associated watercraft and having a forwardly facing portion and rearwardly facing portion, said power head comprising an internal combustion engine having an induction system with an inlet and a surrounding protective cowling, said protective cowling being comprised of a member forming a pair of upwardly facing openings, one of said upwardly facing openings communicating the atmosphere with the interior of said protective cowling, means defining an atmospheric air inlet at a lower portion of said outer cowling, means defining an air flow path between said atmospheric air inlet and other of said upwardly facing openings, and means communicating said other upwardly facing opening only with said induction system inlet for providing air for the engine operation.

13. A protective cowling for the power head of a outboard motor as set forth in claim 12 wherein the air flow path is formed by a recess in the member and a plurality of baffles formed integrally with said member and cooperating baffles formed on a cover piece affixed to said member and defining with said member recess the atmospheric air inlet.

14. A protective cowling for the power head of an outboard motor as set forth in claim 13 wherein the recess is formed in a forward portion of the member.

15. A protective cowling for the power head of an outboard motor as set forth in claim 14 wherein the baffles extend generally horizontally.

16. A protective cowling for the power head of an outboard motor as set forth in claim 14 wherein the other air inlet serves a plurality of induction device air inlets of the engine through a manifold formed internally of the member.

17. A protective cowling for the power head of an outboard motor as set forth in claim 12 further including another atmospheric air inlet formed at the rear portion of the member.

18. A protective cowling for the power head of an outboard motor as set forth in claim 17 wherein the other atmospheric air inlet communicates only with the one upwardly facing opening.

19. A protective cowling for the power head of an outboard motor as set forth in claim 18 wherein the air flow path is formed by a recess in the member and a plurality of baffles formed integrally with said member and cooperating baffles formed on a cover piece affixed to said member and defining with said member recess the first mentioned atmospheric air inlet.

20. A protective cowling for the power head of an outboard motor as set forth in claim 19 wherein the recess is formed in a forward portion of the member.

21. A protective cowling for the power head of an outboard motor as set forth in claim 20 wherein the baffles extend generally horizontally.

22. A protective cowling for the power head of an outboard motor as set forth in claim 21 wherein the first mentioned atmospheric air inlet serves a plurality of induction device inlets of the engine through a manifold formed internally of the member.

* * * * *